United States Patent [19]

Kroczynski et al.

[11] Patent Number: 4,666,114
[45] Date of Patent: May 19, 1987

[54] DEVICE FOR HOLDING ON A NON-HORIZONTAL SURFACE AN APPARATUS CAPABLE OF MOVING ALONG SAID SURFACE

[75] Inventors: Patrice A. Kroczynski, Los Angeles, Calif.; Jean-Pierre Moreau, La Panne, Belgium

[73] Assignee: International Robotic Engineering, Inc., New York, N.Y.

[21] Appl. No.: 762,729

[22] PCT Filed: Nov. 27, 1984

[86] PCT No.: PCT/FR84/00282
§ 371 Date: Jul. 26, 1985
§ 102(e) Date: Jul. 26, 1985

[87] PCT Pub. No.: WO85/02360
PCT Pub. Date: Jun. 6, 1985

[30] Foreign Application Priority Data

Nov. 28, 1983 [FR] France ............................... 83 18960

[51] Int. Cl.⁴ .............................................. E04G 3/00
[52] U.S. Cl. ............................... 248/205.6; 248/206.3; 248/363
[58] Field of Search ............ 248/205.6, 205.5, 205.1, 248/206.1, 206.3, 206.5, 362, 363, 680, 681

[56] References Cited

U.S. PATENT DOCUMENTS

| | | | |
|---|---|---|---|
| 1,598,559 | 8/1926 | Cohen | 248/205.6 |
| 3,305,202 | 2/1967 | Christenson | 248/362 X |
| 3,409,854 | 11/1968 | Swallert | |
| 3,918,666 | 11/1975 | Florian | 248/206.3 X |
| 4,197,796 | 4/1980 | Salatka | 248/206.1 X |

FOREIGN PATENT DOCUMENTS

| | | |
|---|---|---|
| 0010034 | 4/1980 | European Pat. Off. |
| 0106709 | 4/1984 | European Pat. Off. |
| 1266182 | 5/1961 | France |
| 2221243 | 10/1974 | France |

*Primary Examiner*—Ramon O. Ramirez
*Attorney, Agent, or Firm*—Charles E. Temko

[57] ABSTRACT

The invention relates to a device for maintaining on a non-horizontal surface an apparatus adapted to move along said surface.

Said device consists, according to the invention, of a support (1) adapted to move normally to the surface carrying the apparatus, of a rocking lever (5) having a flexibility held within a certain range to allow it to accommodate changes in curvature, and of at least two suction cups mounted close to the ends of the rocking lever. There is thus afforded a more reliable, less expensive holding effect.

8 Claims, 1 Drawing Figure

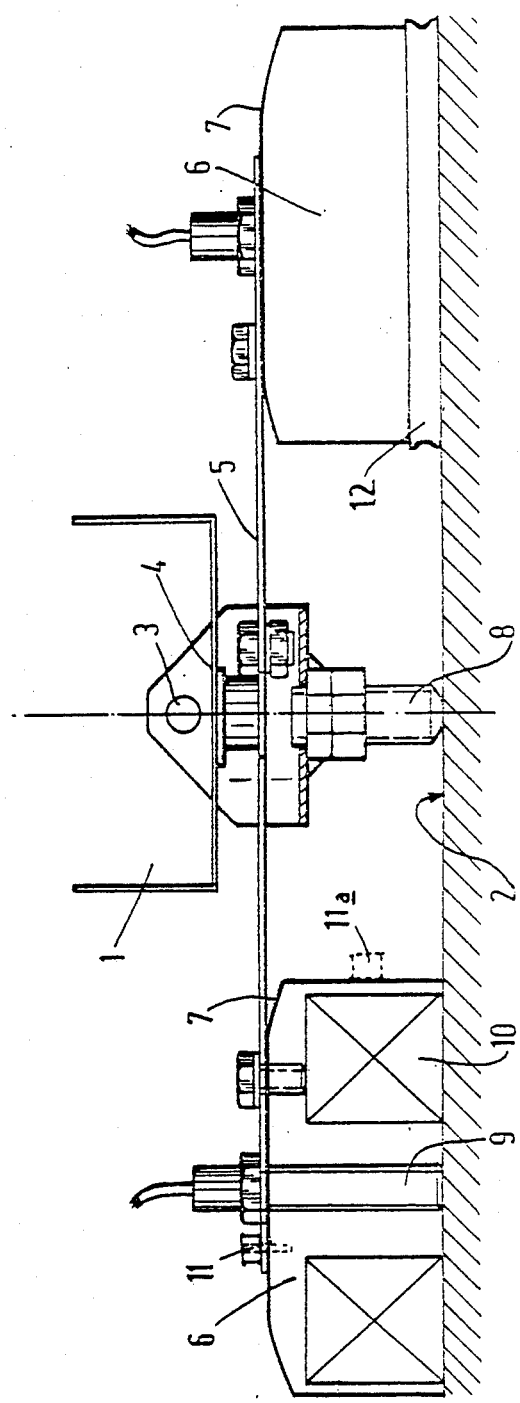

DEVICE FOR HOLDING ON A NON-HORIZONTAL SURFACE AN APPARATUS CAPABLE OF MOVING ALONG SAID SURFACE

The present invention relates to a device for holdng on a non-horizontal surface an apparatus capable of moving along said surface. More particularly, it relates to an apparatus such as described in Patent application EP-A-0084012. This reference describes a self-contained apparatus capable of moving along a non-horizontal surface and including a first moving system and a second moving system connected to the first system by means affording a relative movement by translation and by rotation in a plane parallel with said surface, and first and second holding means carried by the first and second moving systems, respectively, and capable of removably securing said apparatus on said surface characterized in that the holding means carried by at least one moving system are connected to said moving system through jacks apt to move said moving system with respect to said holding means in a direction perpendicular to said surface. Said holding means are advantageously formed, according to said patent, by several adhesion devices which are magnetic or pneumatic suction cups, and it is contemplated that one suction cup may be replaced by several smaller suction cups which are interconnected. This solution is obviously advantageous, since it affords reduction of the costs. A suction cup of great size is, indeed, more expensive than an assembly of equivalent efficiency including smaller suction cups.

In the parent patent, there is provided, between each jack adapted to move the moving system with respect to the holding means normally to the surface carrying the same and said holding means, a swivel-joint whereby the changes in curvature of said surface may be accommodated.

However, it became apparent that such a swivel-joint is a delicate, expensive instrument, and that a single swivel-joint interposed between a jack and an assembly including several suction cups was not always capable of affording perfect accommodation by the holding means especially when the curvature is not constant on the scale of the holding means.

An object of the present invention is therefore to solve those problems and to provide a connection between a jack and a suction cup assembly which is simultaneously more reliable, cheaper and less delicate than the prior arrangement.

A further object of the invention is to improve the accuracy in the detection of the position of the suction cups with respect to the wall. It is known that the positioning of the jacks is dependent upon the detection of the suction cup positions, so that an improvement in this detection is obviously related to the improvement of the holding means.

The present invention therefore provides an apparatus according to claim 1 of the parent patent wherein the holdng means include at least one assembly comprising at least two suction cups, having the feature that each of said assemblies includes:

a support adapted to move normally to said surface;

a flexible rocking lever pivotally mounted at its central portion on said support, and;

at least two magnetic or pneumatic suction cups close to the ends of the rocking lever, the flexibility of the rocking lever being sufficient to allow the suction cups to accommodate the expected changes in the curvature of the surface, but insufficient to cause detachment of the suction cups under the action of forces liable to result from the operation of the apparatus.

According to advantageous embodiments:

the rocking lever consists of an elongate leaf which carries a suction cup close to each of its ends, The suction cups are secured on the rocking lever at the central portion of their rear face, which is opposite to their operative face, said rear face having around its edges sufficient convexity or conicity not to impede bending motion of the rocking lever, the rocking lever is provided, on its face facing the surface which co-acts with the suction cups, with a resilient stop, which is located in its central part and adapted to resist to exaggerated bending of said rocking lever, said rocking lever has at rest at curvature with a concavity facing said surface, each suction cup is equipped with a proximity detector arranged in the axial region of the suction cup and adapted to emit signals when said suction cup is substantially in contact with said surface.

The invention will now be further described by means of a practical non restrictive example illustrated by the single FIGURE.

Said FIGURE is a partial longitudinal cross-sectional view of an assembly comprising two suction cups.

Shown thereon is the end of a support 1, which may be connected to the rod of a jack extending normal to the surface 2 along which the apparatus is to move, and which is herein shown as a plane surface, but which may be curved. The support 1 may also be connected to a tool carried by the apparatus.

Support 1 has a bore parallel to said surface, and wherein a pin 3 is inserted, which pin supports a clevis 4 fast with the flexible rocking lever 5, which constitutes an important element of the invention. Said rocking lever consists of a stainless steel leaf having a flexbility which was determined taking into account considerations which will be set forth hereafter. The rocking lever has a rectangular shape which is elongated at right angle to pin 3, and which slightly tapers towards the ends, clevis 4 is secured by screws substantially at its midpoint.

At the ends of the flexible rocking lever, two suction cups 6 are secured by screws. Here, these are magnetic suction cups, one of which is shown in section (on the left side of the FIGURE). This suction cup is of conventional type, the sole peculiar feature thereof being that its rear face 7, i.e. its face opposite to its operative face, which is facing the surface 2, is of frustoconical shape, the suction cup, or more precisely the cover thereof, being higher at the center, whereas it is secured on the rocking lever 5, than on its edges. The suction cups 6 could be of the pneumatic type, but even in that case it is preferable that their rear face should have this peculiar feature.

The rocking lever could be triangular or star-shaped, and carry one suction cup of the same kind at each apex of the triangle or each tip of the star. In this case, the connection of the rocking lever with the support 1 should include a universal joint or a swivel-joint, since the connection through pin 3 and clevis 4 does not permit universal pivotal motion. Due to the width of its end, the support 1 acts as an abutment which limits the tilting of the rocking lever 5 with respect to said support.

Said tilting results from the average angle which may be formed by surface 2 with the direction of the support, and the maximal value thereof is predetermined.

In alignment with clevis 4, but on the opposite side of the rocking lever, there is provided an abutment 8 made of elastomer, acting to limit the movement of support 1 and of the central portion of the rocking lever towards surface 2 to such a value that the deflection of rocking lever 5 will always remain within the elastic range.

At rest, the rocking lever 5 has a concavity towards the surface 2 which corresponds to the maximal outwards curvature of said surface 2. Such concavity is provided on account of the following consideration: assuming that the rocking lever be plane at that the assembly consisting of the support, the rocking lever and the suction cups would perform an approach movement towards a surface 2 which is concave, then accomodation could readily occur, and the rocking lever will curve until all the suction cups are applied onto the surface. Assuming on the contrary that the surface 2 be convex, then the shape-accommodating movement of the rocking lever would be impeded by the advancement of support 1 towards surface 2, which would cause the rocking lever to assume a reverse curve due to the resistance provided by the suction cups bearing by the edge thereof on surface 2. This may result in defective adhesion of the suction cups. The latter is avoided by imparting to the rocking lever the just-mentioned concavity, for then the state of things is always the same as in the case where a plane rocking lever faces a surface 2 of concave shape.

The convex or conical shape of the rear face 7 of the suction cups is intended to facilitate accomodation of the curvature of surface 2, by permitting the resiliency of the rocking lever to assume its function along the whole length of the latter, in any circumstances.

The flexibility (or resiliency) of the rocking lever is determined taking into account the following considerations: a rocking lever which is too rigid will cause excessive stresses for good adhesion of the suction cups, while a too flexible rocking lever is liable to allow detachment of a suction cup under the action of a substantial lateral force transmitted by the support 1.

A proximity sensor 9 is disposed along the axis of each suction cup. Here, this is an inductive sensor, but another sensor may be provided. Due to its location, said sensor emits a signal precisely at the moment when the suction cup is in the suitable position. The signal corresponding to this moment acts to cause current to be fed to coil 10 of the suction cup, and to stop the advancement of support 1 towards surface 2. In the case where, for any reason, said advancement of the support would not be stopped, then the abutment 9 would protect the rocking lever against any excessive bending liable to deform or damage it.

Numeral 11 refers to another sensor, called a "safety sensor". This is a mere solenoid of small size which is secured on the rear face of the magnetic suction cup 6. The magnetic field received by said sensor will rapidly vary when the coil 10, being suitably energized, approaches a ferromagnetic surface such as a ship hull. The output of sensor 11 will suddenly decrease and be changed, for example from 5 volts to 3 volts when the contact occurs. These values correspond to a magnetic suction cup of conventional type, of a diameter of 90 mm, said sensor 11 consisting of a solenoid having 500 turns for a diameter of 1 cm. The presence of a paint layer may decrease the voltage drop, but if this voltage remains too high, this correspond to insufficient efficiency of the coil, and therefore to some defect in the adhesion of the apparatus.

Numeral 11a corresponds to another position of sensor 11, on the side of the magnetic cup. In this position, the changes in the magnetic field are reverse to those described above, but the operation is the same.

It is feasible to replace the solenoid type sensor by another sensor responsive to the magnetic field, e.g. a sensor of the Hall effect type.

It will further be noted that the edges off the suction cups carry a rim 12, made of a flexible, resilient material such as an elastomer. For sake of simplification, this rim is only shown on one suction cup. The function of said rim is as follows: when the suction cup is moving at a low distance from the wall 2 and parallel thereto, and when this provides an abnormally high projection, e.g. a weldbead, the rim will slide over said projection, rising the rocking lever 5, due to the flexibility thereof, without any risk of damaging the suction cup 6 and members 9, 10 contained therein.

The invention is applicable to any kind of leg-type robots.

We claim:

1. A device for holding on a non-horizontal surface an apparatus adapted to move along said surface, the device including at least one assembly comprising at least two suction cups, characterized in that said assembly includes: a support (1) adapted to be moved normal to said surface; a rocking lever of limited flexibility (5) pivotally mounted at its central portion on said support, and; a detachable suction cup mounted close to the ends of the rocking lever; whereby pivoting movement of said rocking lever serves to accommodate for variations in the curveture of said surface without causing detachment of either of said suction cups under the effect of forces created by operation of said apparatus.

2. A device according to claim 1 characterized in that the rocking lever consists of an elongated leaf, which carries a suction cup close to each of its ends.

3. A device according to claim 1, characterized in that the suction cups (6) are secured on the rocking lever at the central portion of their rear face (7) which is opposite to their operative face, said rear face having on its edges sufficient convexity or conicity not to impede bending motion of the rocking lever.

4. A device according to claim 1 characterized in that the rocking lever is provided, on its face facing the surface which coacts with the suction cups, with a resilient abutment (8) located in its central portion and adapted to prevent exaggerate bending of said rocking lever.

5. A device according to claim 1 characterized in that the rocking lever (5) has at rest a curvature the concavity of which is facing the surface.

6. A device according to claim 1 characterized in that each suction cup is equiped with a proximity detector (9) disposed in the axial region of the suction cup and capable of emitting signals when said suction cup is substantially in contact with said surface.

7. A device according to claim 1 wherein the suction cups are magnetic, characterized in that each suction cup is equiped with a sensor which is responsive to the changes occuring in the magnetic field emitted by the suction cup when the latter is approaching a ferromagnetic surface.

8. A device according to claim 1 characterized in that each suction cup is equipped with a rim made of flexible material, capable of protecting the suction cup during a movement through a momentary deflection of the rocking lever upon engagement of a roughness on the surface.

* * * * *